Figure 1:
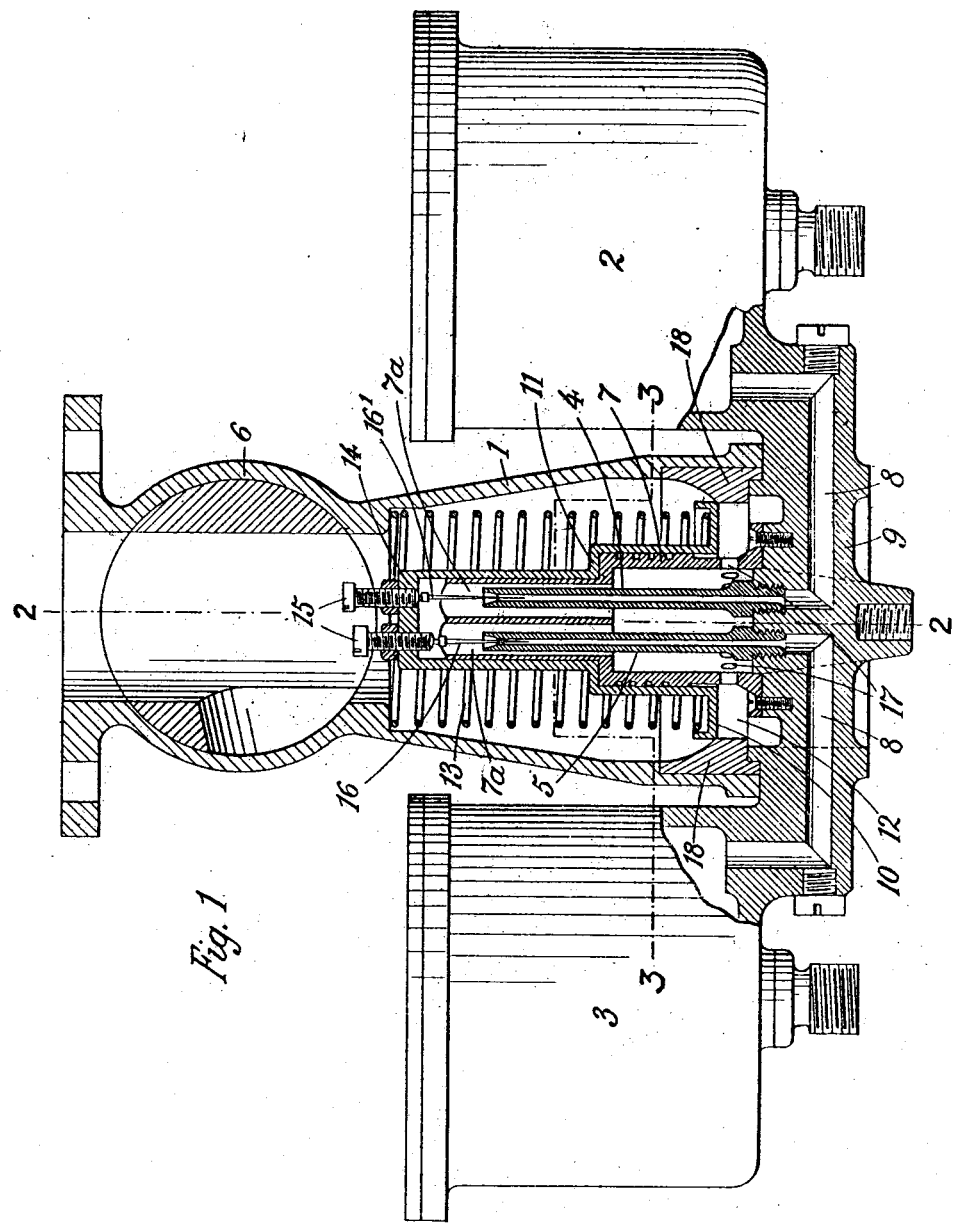

B. T. HAMILTON.
CARBURETER.
APPLICATION FILED MAR. 17, 1913.

1,111,224.

Patented Sept. 22, 1914.
4 SHEETS—SHEET 2.

B. T. HAMILTON.
CARBURETER.
APPLICATION FILED MAR. 17, 1913.

1,111,224.

Patented Sept. 22, 1914.
4 SHEETS—SHEET 4.

Attest
H. L. Alden
N. M. Barrett

Inventor
Belton T. Hamilton
by Spear, Middleton, Donaldson & Spear
Attys.

UNITED STATES PATENT OFFICE.

BELTON TATTNALL HAMILTON, OF FINCHLEY, ENGLAND.

CARBURETER.

1,111,224. Specification of Letters Patent. Patented Sept. 22, 1914.

Application filed March 17, 1913. Serial No. 754,877.

*To all whom it may concern:*

Be it known that I, BELTON TATTNALL HAMILTON, residing in Finchley, Middlesex, England, have invented certain new and useful Improvements in Carbureters, of which the following is a specification.

The object of this invention is to provide a carbureter for internal combustion engines, whereby an engine may be supplied with a homogeneous mixture of two or more liquid fuels of different compositions or densities, mixed with a suitable proportion of air to form an explosive mixture. The chief object in using two different fuels is to enable a cheap and dense fuel to be used in conjunction with a more expensive and light fuel, as by so doing, I can very considerably reduce the cost of running the engine. For instance, a mixture of paraffin, petrol and air may be utilized. The advantage of this arrangement is as follows:—Suppose, for instance, paraffin oil costs 6d. per gallon and petrol 14d. per gallon, and I use an equal proportion of each, the resultant mixture will cost 10d. per gallon showing a saving of 4d. per gallon or nearly 30% of the cost of using petrol solely. In the case of the engines of an automobile, it is advisable, if not absolutely necessary for efficient working, that the engine should be started on a charge consisting solely or substantially of petrol or light spirit, but it can be subsequently run on a mixture of petrol and paraffin oil in approximately equal proportions, as such proportions give quite satisfactory results, although the relative proportions of the fuels may be varied considerably according to circumstances.

According to my invention the carbureter comprises a mixing chamber adapted to be put into direct communication with the engine, through a throttle valve, an air inlet valve and two or more fuel jets or inlets through which the fuel enters directly into the mixing chamber, or discharges into small air by-passes and thence into the mixing chamber on the engine side of the air inlet valve, the fuel jets being controlled so as to be opened and closed progressively and simultaneously with the opening and closing of the air valve, which is preferably effected automatically by the suction of the engine, although it is within my invention to arrange the apparatus so that the air inlet valve may be operated mechanically or by hand.

According to another feature of my invention the movement of the air inlet valve of the carbureter, and simultaneously with it the opening of the fuel nozzles, may be effected or controlled by the movement of the throttle, so that they all open and close simultaneously and in a constant ratio. Or I may employ the multiple jets in connection with a rotary or other throttle valve, which itself contains or constitutes the air inlet valve.

Further features of the invention relate to means for adjusting the air inlet and also the fuel inlets.

In all cases it is essential, according to my invention, that the mixture of fuel and air should take place on the engine side of the air valve, or in other words between the air inlet valve and the engine, as otherwise the control of the fuel jets could not be progressive and simultaneous with the movement of the air valve so as to obtain a constant mixture at all times, which is the object of the invention.

I will now describe my invention with reference to the accompanying drawings in which two examples of carbureter according to my invention are illustrated.

Figure 2:
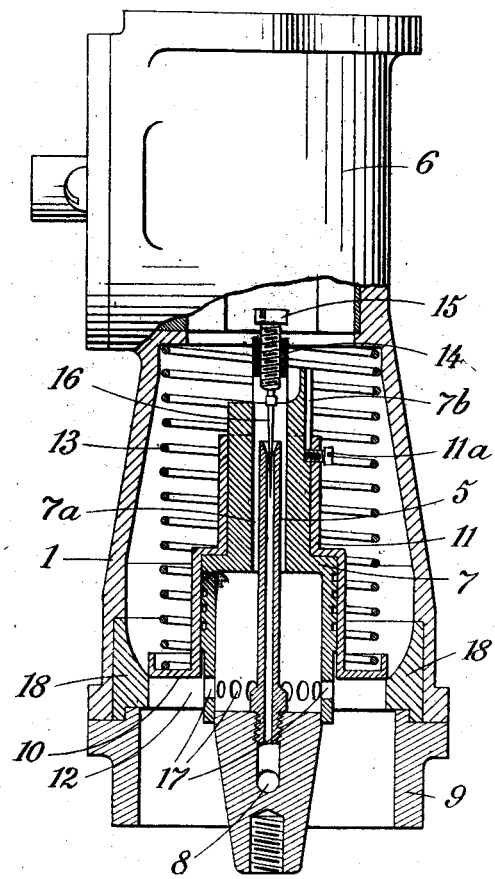
Figure 3:
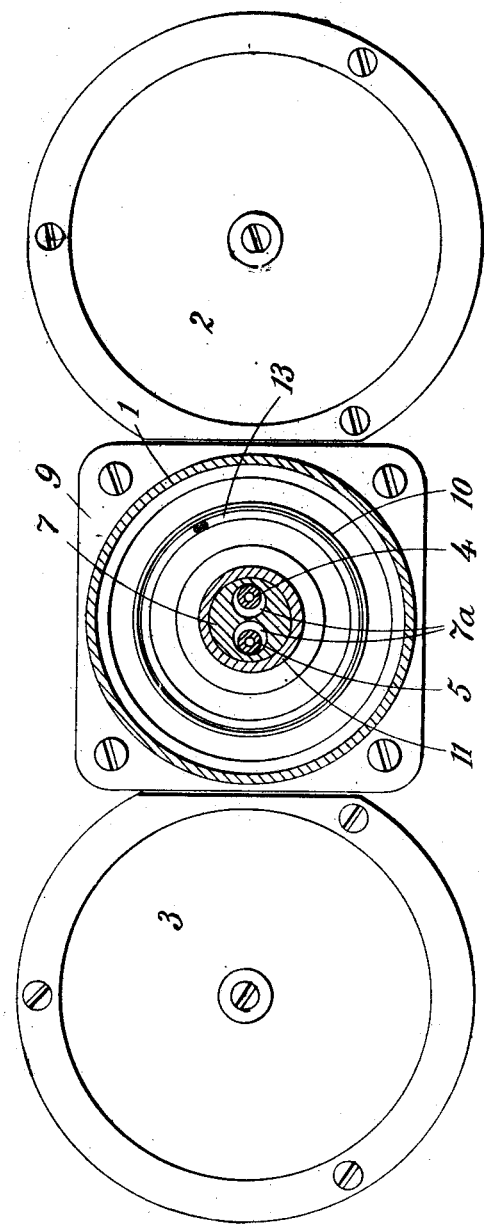
Figure 4:
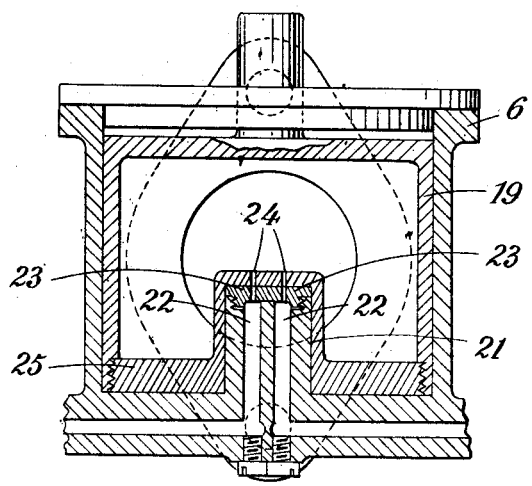
Figure 5:
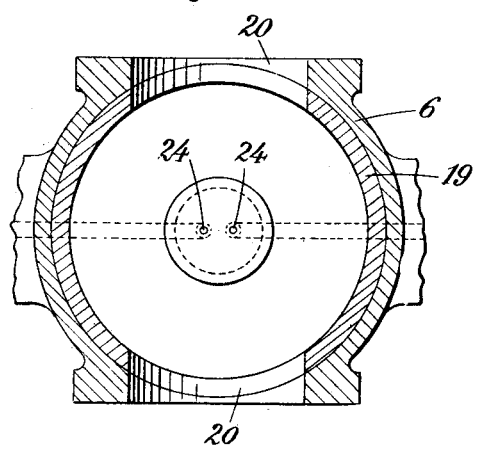

Figure 1 is a vertical section of a carbureter of the type in which the fuel and air inlets are simultaneously and automatically operated; Fig. 2 being a vertical section on the line 2—2 of Fig. 1. Fig. 3 is a horizontal section on the line 3—3 of Fig. 1, looking in the direction of the arrow (Fig. 1). Fig. 4 is a vertical section of a form of carbureter in which a rotary throttle valve is directly connected with the fuel inlet regulating means; and Fig. 5 is a horizontal section of Fig. 4.

Referring now to Figs. 1, 2 and 3, the carbureter comprises mainly a mixing chamber 1, two float feed fuel reservoirs 2, 3, communicating respectively with two fuel jets 4, 5, arranged centrally in the mixing chamber 1, and a throttle 6 communicating with the engine.

The jets or nozzles 4, 5, are arranged adjacent to each other in a common choke tube 7, the upper part of which has two bores or passages 7ª into which the upper ends of the jets 4, 5 project. Each jet is separately in communication with its float chamber by means of a tubular passage 8 in the base or connecting piece 9, one chamber being supplied with one fuel, say petrol, and the other with a heavier fuel, say paraffin.

Surrounding the choke tube 7 is a disk-shaped air valve 10, on the lower end of a tubular body 11 fitting over the choke tube and acting as a dashpot. The air valve 10 is adapted to open and close the air inlet 12 to the chamber 1 and is normally pressed against its seat by a spring 13. The valve works in a conoidal part of the chamber 1, the curvature of the wall of this chamber being such that a constant ratio of opening is maintained between the air and fuel inlets.

The upper part of the tubular extension 11 of the valve 10 is formed or provided with a bridge-piece 14 extending centrally over the jets 4, 5, and carrying two adjustable set screws 15, which in turn carry tapering needles 16 and 16' registering with and operating in the jet nozzles.

It will be obvious that as the air valve 10 opens in response to the suction of the engine, both jets 4, 5, will be simultaneously opened in direct proportion, if of the same size, and an exactly equal quantity of petrol and paraffin will be induced, which, mixing with the air, is carried to the engine cylinder and then exploded in the usual manner. The tubular extension 11 may be provided with a small screw 11ª engaging in a vertical groove 7ᵇ in the choke tube 7, to guide the valve piece in its up and down movements.

It is obvious that the diameters of the two nozzle openings and their respective needles may differ to give any proportion of admixture of the fuels which may be desired, and that, owing to the general construction and functioning of the device this proportion will be maintained in the mixture over all ranges of engine speed or throttle opening.

In adjusting the needles, the needle 16, governing the paraffin, is preferably screwed down until this fuel is completely cut off when the air valve is in its lowest or closed position, but the petrol control needle 16' is so adjusted to allow sufficient petrol to pass, when the air valve is in its lowest position, to make a good mixture with the air passing up through the choke tube 7, through the air inlet perforations 17. Consequently when the engine is started up, or running on low throttle, it will run on a mixture of petrol and air only, but directly the throttle is opened the increased suction creates a partial vacuum in the mixing chamber which the small amount of gas passing through the central choke tube is unable to fill. The air valve is therefore lifted from its seat and admits sufficient air to supply the increased demand of the engine, but the rising air valve not only admits the required amount of air, but carrying the two tapered needles with it, the jet orifices are opened and allow such a quantity of fuel, both petrol and paraffin, to pass, which is in exact proportion to the amount of air admitted by the valve. Therefore, by merely opening the throttle, the driver automatically brings into operation simultaneously both the petrol and paraffin jets, and the engine continues to use the mixed fuels in the correct proportion.

While I have shown and described the throttle valve and air inlet valve as being independent the one of the other, they may be connected or operated together in any suitable manner, so that the two will be opened and closed simultaneously and proportionately.

Although I preferably arrange the air inlet valve and jet controls as a single or integral member, they may be separate and connected or operated together, say, from the throttle or other control, automatic or otherwise, so as to move simultaneously.

I sometimes find it convenient, instead of forming the conoidal part of the mixing chamber 1 in one therewith, to make it as a separate ring fitting therein, as shown at 18 in Figs. 1 and 2. I can thus, by supplying a number of rings, of which the inside curvature differs, the one from the other, provide independent variable or exchangeable means for varying, as desired, the relative proportions of air and fuel supplied to the engine, and so adapt the carbureter to varying conditions etc., or this regulation of the desirable ratio of air to fuel in the mixture may be effected in any other suitable manner.

In Figs. 4 and 5, I have illustrated the application of my invention to a construction in which the mixing chamber is arranged within a rotary throttle valve. Within the casing 6 is arranged a cylindrical throttle valve 19, the casing and valve having the usual inlet and outlet openings 20. Projecting up centrally into the casing, 6, is a tubular extension 21 having two vertical bores 22, 22 communicating respectively with supplies of petrol and paraffin, and having reduced outlets or jets 23 at their upper ends. The plate 25 secured to the throttle valve 19 is correspondingly shaped, so as to fit within the casing 6 and over the projection 21. The central projection of the plate 25 is provided with two bores or outlets 24 so shaped or arranged that when the throttle is fully open the passages 23 and 24 are in complete alinement so that the maximum fuel openings are provided; as the throttle is closed the passage 24 gradually moves out of alinement with the passage 23, and thus the fuel openings are reduced correspondingly.

While I have described my invention in connection with a needle valve form of carbureter, it is to be understood that it is applicable to other forms of carbureters or air and combustible fuel mixing devices.

While for all practical purposes, I believe that two fuel inlets and two kinds of fuel will be sufficient, I do not wish to limit myself thereto, as it may, in some cases, be desirable to employ a greater number than two.

What I claim and desire to secure by Letters Patent is:—

1. A carbureter comprising a mixing chamber, an air inlet valve, a central tubular projection in said mixing chamber, a plurality of fuel inlets in said tubular projection, passages for different fuel communicating with said inlets, and means operated in accordance with the opening and closing of the air valve for opening and closing the fuel jet openings progressively and simultaneously with the opening and closing of the air valve.

2. A carbureter comprising a mixing chamber, an air inlet valve, a central tubular projection in said mixing chamber, a plurality of fuel inlets in said tubular projection, passages for different fuels communicating with said inlets, and relatively adjustable means operated in accordance with the opening and closing of the air valve for opening and closing the fuel jet openings progressively and simultaneously with the opening and closing of the air valve, for the purpose set forth.

3. A carbureter comprising a mixing chamber, an air inlet valve, a central tubular projection in said mixing chamber, a plurality of fuel inlets in said tubular projection, passages for different fuel communicating with said inlets, and means carried by the air valve for opening and closing the fuel jet openings progressively and simultaneously with the opening and closing of the air valve.

4. A carbureter comprising a mixing chamber, an air inlet valve, a central tubular projection in said mixing chamber, a plurality of fuel inlets in said tubular projection, passages for different fuel communicating with said inlets, and relatively adjustable means carried by the air valve for opening and closing the fuel jet openings progressively and simultaneously with the opening and closing of the air valve.

5. A carbureter comprising a mixing chamber, an air inlet valve, a central tubular projection in said mixing chamber, a plurality of fuel inlets in said tubular projection, passages for different fuel communicating with said inlets, means operated in accordance with the opening and closing of the air valve for opening and closing the fuel jet openings progressively and simultaneously with the opening and closing of the air valve, and removable means for varying the area of the air inlet for the purpose set forth.

6. A carbureter comprising a mixing chamber, an air inlet valve, a central tubular projection in said mixing chamber, a plurality of fuel inlets in said tubular projection, passages for different fuels communicating with said inlets, relatively adjustable means operated in accordance with the opening and closing of the air valve for opening and closing the fuel jet openings progressively and simultaneously with the opening and closing of the air valve, and removable means for varying the area of the air inlet for the purpose set forth.

7. A carbureter comprising a mixing chamber, an air inlet valve, a central tubular projection in said mixing chamber, a plurality of fuel inlets in said tubular projection, passages for different fuels communicating with said inlets, means carried by the air valve for opening and closing the fuel jet openings progressively and simultaneously with the opening and closing of the air valve, and removable means for varying the area of the air inlet for the purpose set forth.

8. A carbureter comprising a mixing chamber, an air inlet valve, a central tubular projection in said mixing chamber, a plurality of fuel inlets in said tubular projection, passages for different fuel communicating with said inlets, relatively adjustable means carried by the air valve for opening and closing the fuel jet openings progressively and simultaneously with the opening and closing of the air valve, and removable means for varying the area of the air inlet for the purpose set forth.

9. A carbureter comprising a mixing chamber, an air inlet valve, a central tubular projection in said mixing chamber, a plurality of fuel inlets in said tubular projection, passages for different fuel communicating with said inlets, and an inlet valve surrounding the lower part of said tubular projection, a tubular extension of said air valve surrounding the fuel jets, independently adjustable means carried by said tubular extension for opening and closing the fuel jet openings progressively and simultaneously with the opening and closing of the air valve for the purpose set forth.

10. A carbureter comprising a mixing chamber, an air inlet valve, a central tubular projection in said mixing chamber, a plurality of fuel inlets in said tubular projection, passages for different fuel communicating with said inlets, an inlet valve surrounding the lower part of said tubular projection, a tubular extension of said air valve surrounding the fuel jets, independently adjustable means carried by said tubular extension for opening and closing the fuel jet openings progressively and simultaneously with the opening and closing of the air valve, and removable means for varying the area of the air inlet for the purpose set forth.

In testimony whereof I have affixed my signature in presence of two witnesses.

BELTON TATTNALL HAMILTON.

Witnesses:
  ALBERT JONES,
  THOMAS O. MILES.